(12) United States Patent
White

(10) Patent No.: US 6,182,529 B1
(45) Date of Patent: Feb. 6, 2001

(54) HANDLEBAR FOR WHEELCHAIRS

(76) Inventor: Robert White, 9657 Whittington Dr., Jacksonville, FL (US) 32257

( * ) Notice: Under 35 U.S.C. 154(b), the term of this patent shall be extended for 0 days.

(21) Appl. No.: 09/129,796

(22) Filed: Aug. 6, 1998

(51) Int. Cl.$^7$ .............................. B62J 39/00; B62K 21/12
(52) U.S. Cl. ...................... 74/551.1; 280/304.1; 16/430
(58) Field of Search ..................... 74/551.1; 280/304.1; 16/430, 422; D12/133, 178

(56) References Cited

U.S. PATENT DOCUMENTS

| | | |
|---|---|---|
| D. 27,660 * | 9/1897 | Anschuetz ........................... D12/178 |
| D. 342,046 | 12/1993 | Chen . |
| D. 390,168 | 2/1998 | Haut . |
| 4,386,790 | 6/1983 | Kassai . |
| 4,708,357 | 11/1987 | Sederbaum . |
| 4,872,697 | 10/1989 | Berkowitz . |
| 4,896,897 | 1/1990 | Wilhelm . |
| 4,964,648 | 10/1990 | Berkowitz . |
| 5,044,650 * | 9/1991 | Eberle, Jr. ......................... 280/304.1 |
| 5,290,055 * | 3/1994 | Treat, Jr. ........................... 280/304.1 |
| 5,758,548 | 7/1998 | Smith . |
| 5,788,252 * | 8/1998 | Happ et al. ............................. 16/430 |
| 5,915,712 * | 6/1999 | Stephenson et al. ............. 280/304.1 |
| 5,974,627 * | 11/1999 | Huang ................................... 16/422 |

OTHER PUBLICATIONS

Undated Advertising Material—CASBAR—Cites Previously Disclosed US 5240055.

* cited by examiner

Primary Examiner—Mary Ann Green
(74) Attorney, Agent, or Firm—Arthur G. Yeager

(57) ABSTRACT

A handlebar adapted to be fitted onto the handles of a wheelchair having two substantially parallel handles, together with an improved push-button mechanism for locking the handlebar securely into position. The handlebar is designed with multiple ergonomically correct gripping stations which reduce strain on the hands, wrists and forearms of a person using the handlebar. Methods of retrofitting existing wheelchairs, as well as tools used in performing the retrofitting operation, are also provided.

20 Claims, 7 Drawing Sheets

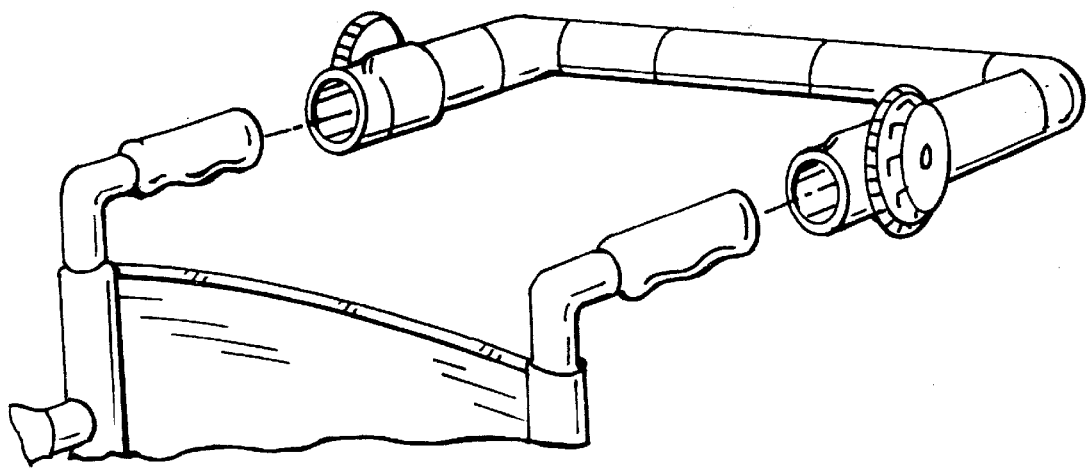
FIG. IA
PRIOR ART
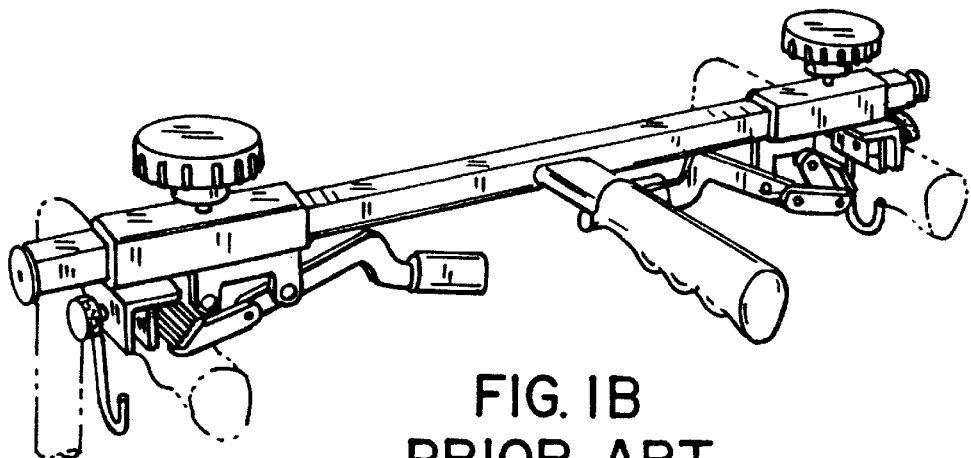
FIG. IB
PRIOR ART

HANDLEBAR FOR WHEELCHAIRS

FIELD OF THE INVENTION

The field of the invention is to provide an improved handlebar for manipulating non-motorized wheelchairs or similar vehicles. The handlebar also functions as a brace to protect collapsible wheelchairs against unintended collapse.

BACKGROUND ART

Most existing wheelchairs have two parallel, rearwardly-directed handles which are (a) separated by a distance equal to the width of the wheelchair (18 to 24 inches), and (b) parallel to the ground. This paired-handle design requires use of two hands for control of the wheelchair, making it difficult for a person to push a wheelchair with only one free hand. This is not a minor problem within a hospital environment, as sometimes medical or other equipment must be moved along with the wheelchair. Either two persons must then be used to move a single person in a wheelchair, or one person must push the wheelchair with one hand, and manipulate the equipment with the other, which is awkward and at times unsafe. Outside of the hospital environment, one may be in a situation where one must push a wheelchair-bound person with one hand, while carrying an umbrella or holding a parcel with the other.

Additionally, manual manipulation of a wheelchair using the standard, rearwardly-directed handles is ergonomically unsound or inefficient. The person pushing the wheelchair is forced to (a) grip the handle tightly with the hand, (b) orient and lock the wrist in an ulnar-deviated position, and (c) orient the forearm in a supinated position. These positions are uncomfortable, tiring, and drain strength.

There is a great need for wheelchair handlebars that allow a person pushing the wheelchair to do so in an ergonomically correct manner, grasping the handlebar loosely with either hand, or with both hands, without any uncomfortable twisting and/or bending of the forearms and wrists. To date, no completely satisfactory design has been proposed.

A number of wheelchair handlebars have been developed, such as those shown in U.S. Pat. Nos. 5,290,055 and 5,044,650 (see FIG. 1a).

These usually connect the handles with a straight bar that does relieve the strain on the hands and forearms, but do little to relieve the strain caused by ulnar deviated positioning of the wrists. Another handlebar design found in U.S. Pat. No. 4,872,697 (see FIG. 1b) is designed to allow a person to push a wheelchair with one hand. The parallel handles are connected with a crosspiece, and a single handgrip, or grip station, projects horizontally from the crosspiece. The grip station is substantially parallel to the handles, and provides no significant ergonomic advantage over the original handles.

Also, these handlebars are usually fitted to the existing handles by means of screw clamps or other forms of clamps. These clamps have the drawback that, if the clamps are not securely tightened or if they are accidentally loosened, the handlebar may come loose from the handles. These clamps often consist of multiple parts and project significantly out of the plane of the handles. They can also be time consuming to use. In a few cases, the crosspiece of the handlebar cannot be comfortably gripped due to the clamping mechanism. As previously stated, the grip station in the handlebar of FIG. 1a is ergonomically very poor. Unfortunately, the crosspiece to which the grip station is secured cannot be comfortably gripped by a user either due to the bulky and complicated clamping mechanism.

SUMMARY OF THE INVENTION

It is a first object of the invention to provide an improved, ergonomically correct handlebar for wheelchairs or similar articles having two substantially parallel tubular handles. The handlebar should be adapted to be fitted to the existing handles and securely locked into position.

It is a second object of the invention to provide a novel mechanism for locking a handlebar onto the existing handles of a wheelchair or similar vehicle.

It is a third object of the invention to provide a handlebar for a collapsible wheelchair which may be used to brace the wheelchair against unintended collapse, yet which may be quickly removed and conveniently stowed when the wheelchair is collapsed.

It is a fourth object of the invention to provide a method of adapting existing wheelchairs so that they may receive the handlebar of the invention, and an apparatus for use in carrying out this method.

These objects are achieved with the handlebar of the present invention. The handlebar is a tube having a two parallel end portions which slide over the existing handles of the wheelchair. The parallel end portions are connected by a central portion having multiple grip stations. Two ergonomically designed first grip stations are provided, one oriented so as to be gripped by the right hand and one oriented so as to be gripped by the left hand. The first grip stations are mirror images of each other. Further grip stations may be provided.

The handlebar is locked into position by two locking mechanisms, one positioned in each preexisting wheelchair handle. Each locking mechanism comprises an outwardly biased button which protrudes through correspondingly positioned holes in the wall of the wheelchair handle and the handlebar.

The grip sections on the central portion of the handlebar are positioned so that a user may grip the handlebar comfortably, without having to exert strain on his wrist, or bend his wrist uncomfortably.

Retrofitting of existing wheelchairs is easy, requiring merely that properly positioned holes be drilled in the preexisting wheelchair handles and that locking mechanisms be positioned in each handle.

While the handlebar described herein is primarily intended for a wheelchair, it is not limited to wheelchairs. Specifically, handlebars having a similar structure may be used with any manually operated vehicle having rearwardly directed handlebars, including wheelbarrows, shopping carts, carriages or strollers, and bicycles.

DESCRIPTION OF THE DRAWINGS

FIGS. 1a and 1b illustrate prior art handlebars.

DETAILED DESCRIPTION OF THE INVENTION

A. Ergonomic Handlebar Design

Figure 3A:
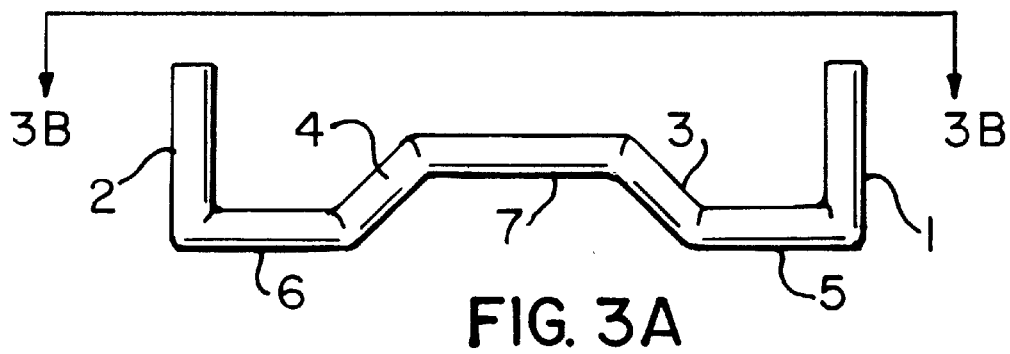
FIGS. 3a, 3b, and 3c provide top, front, and side views of the inventive handlebar.
Figure 3B:
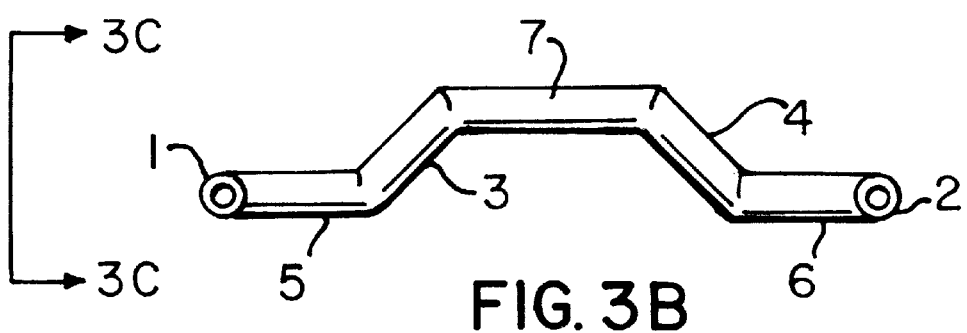
Figure 3C:
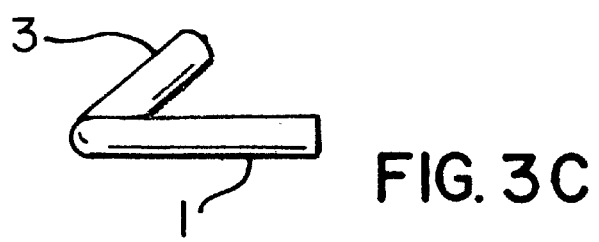

The handlebar of the invention, perspective views of which are shown in FIGS. 3a through 3c, is constructed from a hollow tube of a rigid material having a first end at point A and a second end at point A'. The rigid material may be a metal, such as steel or aluminum, or a plastic, such as polystyrene or polyvinyl chloride (PVC). The handlebar, in its simplest form, a hollow tube having a first end at point A and a second end at point A' which has been shaped by bending the tube at a series of points B, B', C, C', D, and D, located in between points A and A', so that the positions of points A, A', B, B', C, C', D, and D' are defined by the following table of cylindrical coordinates, where height is measured along the B—B' axis, radius r is measured in terms of distance from the B—B' axis, and the angle measures rotation about the B—B' axis:

TABLE OF CYLINDRICAL COORDINATES

Figure 2A:
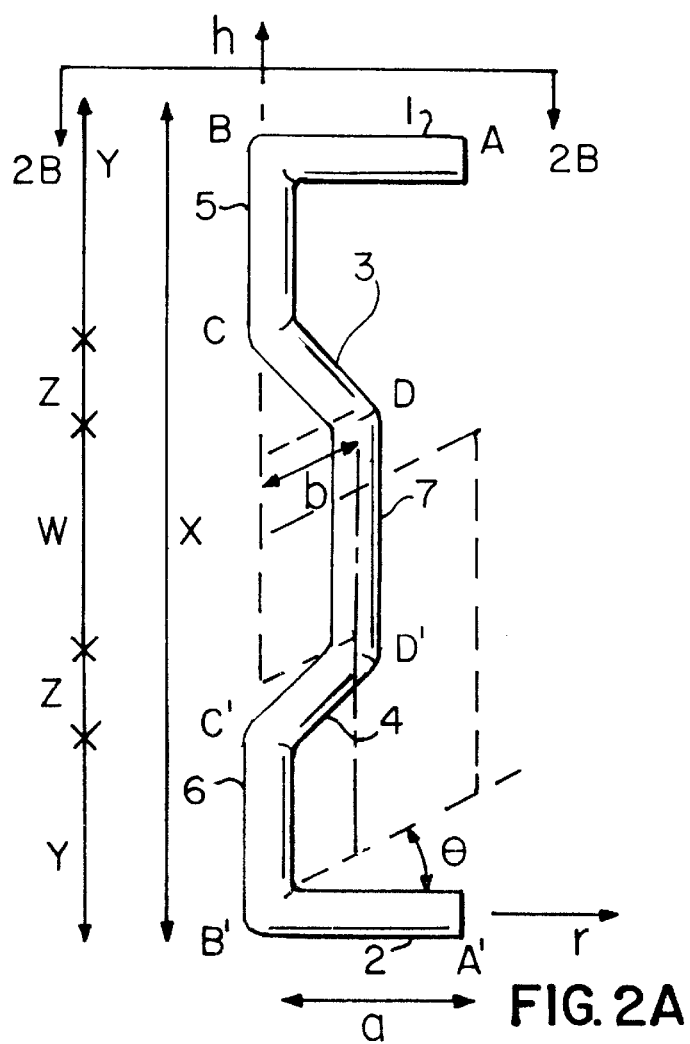
FIGS. 2a, 2b and 2c define the shape of a handlebar formed from a hollow tube according to the invention in terms of a cylindrical coordinate system, and by defining the angles to which the tube is bent.

| POINT | HEIGHT h | RADIUS r | ANGLE |
|-------|----------|----------|-------|
| A     | x        | a        | 0     |
| B     | x        | 0        | 0     |
| C     | x − y    | 0        | 0     |
| D     | x − (y + z) | b     | 30–60° |
| D'    | y + z    | b        | 30–60° |
| C'    | y        | 0        | 0     |
| B'    | 0        | 0        | 0     |
| A'    | 0        | a        | 0     | where $x=2y+2z+w$, where w is the distance between points D and D' and y, z, and w are all greater than zero. The structure of the handlebar in terms of cylindrical coordinates is shown in FIGS. 2a and 2b.

Figure 2C:
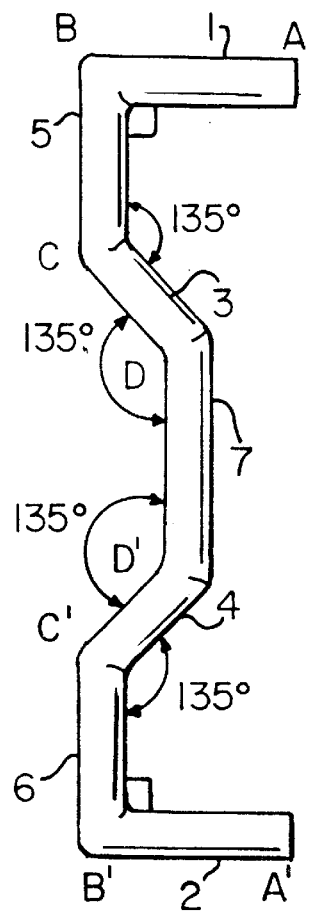
Figure 2B:
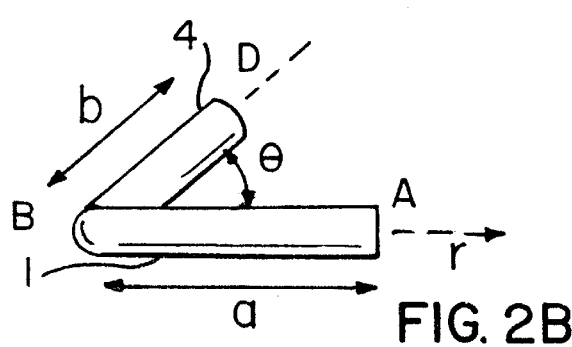

The angles at which the tube is bent at points B, B', C, C', D, and D' are shown in FIG. 2c, and defined by the following table:

TABLE OF ANGLES

| ANGLE   | DEGREES    |
|---------|------------|
| A-B-C   | 90         |
| B-C-D   | 120 to 150 |
| C-D-D'  | 120 to 150 |
| D-D'-C' | 120 to 150 |
| D'-C'-B'| 120 to 150 |
| C'-B'-A'| 90         |

The distance x between point B and point B' is preferably 18 to 24 inches, the distance between point C and point D, and between point C' and point D', is 3.5 to 5.0 inches, and the distance w between point D and point D' is 3.5 to 12 inches.

The first end portion 1 of the handlebar between points A and B and the second end portion 2 of the handlebar between points A' and B' are mutually parallel tubular sections of length a and have defined inner diameters which are greater than the outer diameter of two mutually parallel tubular handles 8 of a wheeled vehicle 9. Therefore, the handlebar may easily be positioned on vehicle 9 by fitting end portions 1 and 2 over handles 8 of a wheeled vehicle 9. The vehicle may be a wheelchair, a wheelbarrow, a baby carriage, a baby stroller, a bicycle, or a similar vehicle. The first and second end portions are pushed over the handles 8 until the rear of each handle 8 makes contact with the interior of the handlebar at point B or point B', where the handlebar makes a right angle bend. A locking mechanism to be described later may then be used to secure the handlebar into position. Preferably, there are no rubber or vinyl grips on handles 8, and the interior of the wall of the handlebar fits closely around handles 8. This results in a tighter fit between the handlebar and the handles than is obtained when handlebars are clamped onto handles with an intervening grip therebetween.

As shown in the top view of FIG. 3a and the front view of FIG. 3b, the portion of the hollow tube between points C and D is a right gripping region 3, adapted to be grasped by the right human hand, and the portion of the handlebar between points C' and D' is a left gripping region 4, adapted to be grasped by the left human hand. Each gripping region is oriented inwardly, toward vehicle 9 and away from a person grasping the handlebar, by 30–60°. Similarly, gripping regions 3 and 4 are rotated upwardly, out of the plane occupied by end portions 1 and 2, by 30–60°, as shown in the side view in FIG. 3c. There is a plane of symmetry between gripping regions 3 and 4.

Orientation of the gripping regions in this manner is highly advantageous. For example, left gripping region 3 may be grasped with the left hand without bending the wrist or forearm unnaturally. There is no need to hold the forearm in a supinated position, or to bend the wrist in an ulnar deviated fashion. The same considerations apply when grasping right gripping region 4 with the right hand. Additionally, when the angled grip stations are grasped, the angles setting each grip station apart from the remainder of the handle (i.e., the angles at points C and D set grip station 3 apart) serve as lateral stops which prevent the user's hands from sliding laterally along the handlebar. This allows the user to grasp the handlebar loosely without sacrificing control. If the handlebar was continuously straight, like that shown in U.S. Pat. No. 5,290,055, the user's hand would tend to slide sideways along the handlebar unless the user grasped the handlebar very tightly, which is strength-draining and ergonomically undesirable. As a further means to prevent the user's hands from sliding along the handlebar, undulated depressions (not shown) into which a user's fingers will fit may be provided on the underside of the handlebar.

Additional grip stations are also provided. The portion of the hollow tube between points C and C' connects grip stations 3 and 4, while also serving as an additional grip station 7. As shown in FIG. 3b, grip station 7 is elevated relative to sections 1 and 2 of the handlebar. This grip station is not as ergonomically advantageous as the angled grip stations 3 and 4, since its horizontal orientation forces the user to twist his forearm slightly into a less comfortable position. However, it is highly advantageous over conventional wheelchair handles in that it is unnecessary to position the wrist in an ulnar deviated position. Additionally, grip station 7 is centrally located, and allows the user to push the wheelchair with a single hand without applying unequal force to the two sides of the wheelchair. Again, the angles setting grip station 7 apart from stations 3 and 4 serve as lateral stops which prevent the user's hand from sliding off of grip station 7. Finally, the portions of the handlebar between points B and C, and between points B' and C', serve as paired grip stations 5 and 6. These horizontal grip stations are provided for people having unusually short or unusually tall stature. For example, a child may have to hold his arms forward horizontally to grasp the handlebar. To grasp angled grip stations 3 and 4, he would then have to bend his wrists sharply downward in an uncomfortable position. In this situation horizontal grip stations 5 and 6 are preferable. Again, the angles at each end of grip stations 5 and 6 serve as lateral stops.

A preferred embodiment of the handlebar is designed for use with a wheelchair having two spaced and parallel handles. For narrow wheelchairs having handlebars separated by a distance of eighteen inches, grip stations 3, 4, 5, and 6 have a preferred length of 3.5 to 5.0 inches, and grip station 7 has a preferred length of 3.5 to 8 inches. This allows each of grip stations 3, 4, 5, and 6 to be gripped comfortably by one hand. Grip station 7 may also be gripped by one hand, or, if it has a length or 7 or 8 inches, by two hands. Similarly, for wider wheelchairs having handlebars separated by a distance of 22 inches, grip stations 3, 4, 5, and 6 have a preferred length of 3.5 to 5.0 inches, and grip station 7 has a preferred length of 3.5 to 12 inches.

For such wheelchair handlebars, the most preferred shape of the handlebar may be defined in terms of the positions of previously defined points A, A', B, B', C, C', D, and D'. These positions are defined by the following table of cylindrical coordinates and the following table of angles:

| TABLE OF CYLINDRICAL COORDINATES | | | |
| --- | --- | --- | --- |
| POINT | HEIGHT | RADIUS | ANGLE |
| A | x | a | 0 |
| B | x | 0 | 0 |
| C | x − y | 0 | 0 |
| D | x − (y + z) | b | 45° |
| D' | y + z | b | 45° |
| C' | y | 0 | 0 |
| B' | 0 | 0 | 0 |
| A' | 0 | a | 0 |

| TABLE OF ANGLES | |
| --- | --- |
| ANGLE | DEGREES |
| A-B-C | 90 |
| B-C-D | 135 |
| C-D-D' | 135 |
| D-D'-C' | 135 |
| D'-C'-B' | 135 |
| C'-B'-A' | 90 |

Additionally, for wheelchair applications, the preferred outer diameter of the handlebar is about 1 to 1.5 inches. It is believed that this provides the most comfortable and ergonomically correct grip. For other applications, handlebars having greater outside diameters may be used. For example, a wheelbarrow handlebar may be constructed with tubular material having an outer diameter of 2 inches.

B. Locking Mechanism

Figure 5A:
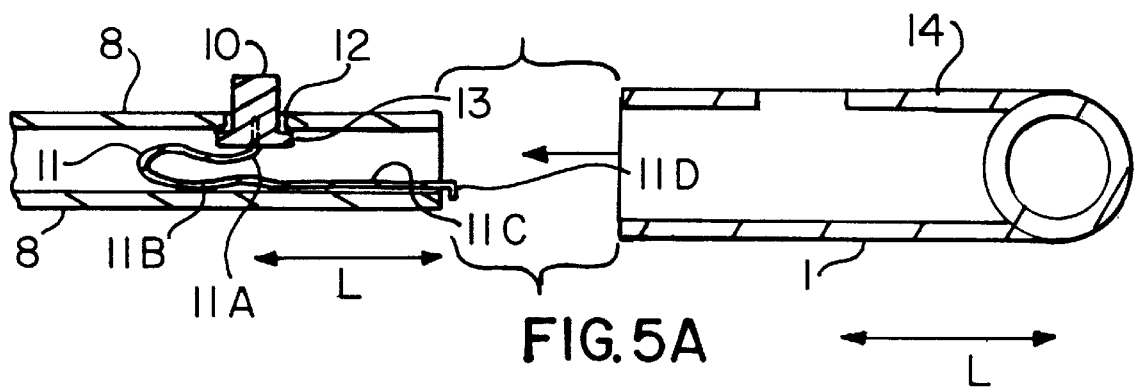
FIGS. 5a and 5b show how the handlebar is fitted into position.

The mechanism for locking the handlebar onto tubular handles 8 will now be described. As shown in FIG. 5a, each of the end sections 1 and 3 of the handlebar has an upwardly-directed hole 14 passing completely through the wall of the handlebar. Each hole 14 is a distance 1 from the nearest right angle turn in the handlebar, where 1 is less than x. Similarly, each handle 8 has an upwardly-directed hole 12 passing through the wall of the handle at a distance 1 from the back of the handle. Holes 12 and 14 all have essentially identical diameters. Thus, when the handlebar is properly fitted onto the vehicle 9 by sliding handlebar end sections 1 and 3 over handles 8, as shown in FIGS. 5a and 5b, a hole 14 in each end portion is positioned over a hole 12 passing through the wall of each handle 5.

Figure 4A:
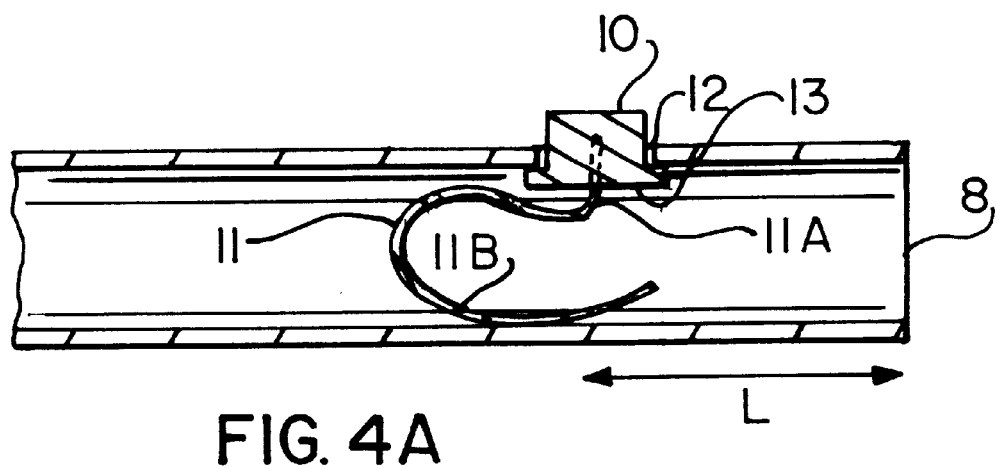
FIGS. 4a and 4b illustrate mechanisms for locking the handlebar of FIG. 1 into position.

A locking mechanism, shown in FIG. 4a, for securing the handlebar onto the wheelchair is positioned inside each handle 8 prior to fitting the handlebar onto handles 8. Each locking mechanism comprises a cylindrical pushbutton 10 and a spring 11. Pushbutton 10 is attached to a first end 11a of the spring, and a second section 11b of the spring is pressed against the inner wall of handle 8. Spring 11 then biases button 10 through hole 12 in the wall of handle 8. Button 10 may be pressed inwardly until the top surface of button 10 is flush with the outer surface of handle 8; however, button 10 normally protrudes beyond the surface of handle 8. Lip 13 on button 10 engages the inner surface of handle 8, preventing button 10 from passing completely through hole 12.

Figure 5B:
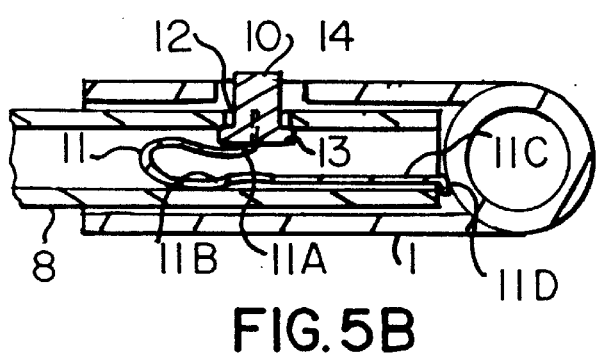

As shown in FIGS. 5a and 5b, the handlebar may be positioned over handles 8 by depressing each button 10 until the top surface of button 10 is flush with the outer surface of the handle 8 in which it is positioned. End portions 1 and 2 of the handlebar then slide over handles 8. When holes 12 in handles 8 coincide with holes 14 in the handlebar, each button 10 is released. Each button 10 is then pressed outwardly by a spring 11 until it passes through hole 12 in handle 8 and hole 14 in the handlebar. This locks each end of the handlebar into position. The handlebar may be removed by depressing buttons 10 again, and then sliding the handlebar off of handles 8.

Spring locks of this type are well known, and are commonly used in the preparation of adjustable crutches and table legs. However, they do not appear to have been used in securing handlebars to the handles of wheelchairs or similar vehicles.

Pushbutton locks of the type shown in FIG. 4a do, however, have some disadvantages. The spring is not secured to the interior of handle 8, other than by the force exerted by section 11b of the spring. Therefore, the spring may shift or migrate out of position when button 10 is depressed. Also, there is nothing to prevent a person installing the spring from accidentally inserting spring 11 too far, or not far enough, into handle 8. If spring 11 is improperly positioned, button 10 may protrude from hole 12 at an angle, possibly leading to a less secure lock between the handlebar and handle 8. Finally, if the spring must be replaced due to wear and/or breakage, it is difficult to grasp a spring having a design as shown in FIG. 4a and remove it from handle 8 without using special tools.

Figure 4B:
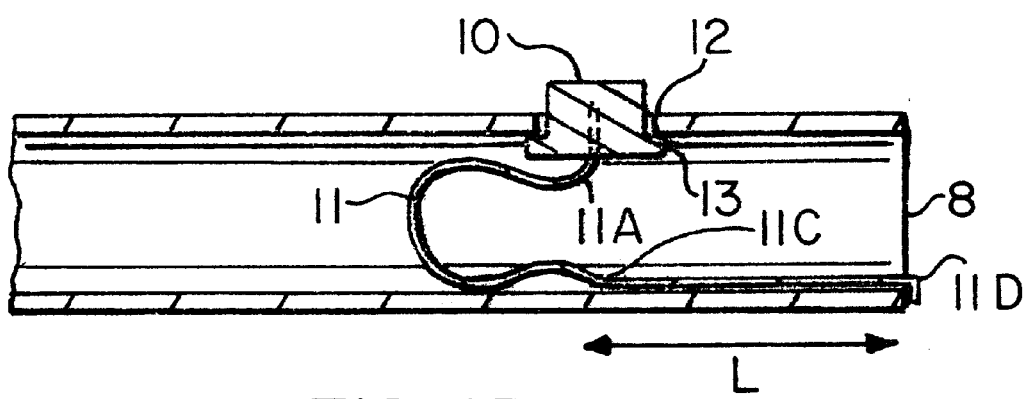

An improved version of the pushbutton lock that avoids these problems is shown in FIG. 4b. Spring 11 is extended, with a linear portion 11c of length l attached to section 11b. Section 11c terminates in hook or stop 11d, which is oriented at a right angle to section 11c. Spring 11 may then be inserted into handle 8 until stop 11d engages the end of the wall of tubular handle 8. This ensures that button 10 is correctly positioned relative to hole 12. Spring 11 then biases button 10 outwardly through hole 12, and forces member 11c to lie in a lengthwise position against the interior of the wall of handle 8. The stop 11d also prevents spring 11 from migrating away from the open end of handle 8 and past hole 12 when button 10 is depressed. Finally, if it becomes necessary to replace spring 11, stop 11d, which protrudes beyond the end of handle 8, may be easily grasped without any specialized tools, greatly easing the process of removing the spring. This spring lock may be used with a conventional handlebar having two mutually parallel female sections which are adapted to fit over handles 8 and are connected by a straight intermediate section, or by the ergonomically designed handlebar of this invention.

The spring lock described herein is a significant improvement over previously known spring locks, which lack the anti-riding stop feature described above. It is also an improvement over previously known devices for securing a handlebar to a wheelchair. Prior art handlebar locking devices are usually more complicated and cumbersome, often involving multiple machined parts, such as clamps, pins, slidable metal sleeves, hinged joints, or other mechanisms. When positioning and securing the handlebar using such devices, more work is required than with the simple pushbutton lock described herein, and there is a greater risk of accidental injury to the fingers. Additionally, with many clamps, there is a greater risk of mechanical failure and/or loss of detachable parts.

The spring lock having a stop may also be used with other devices having a lock using a spring-biased push button, including crutches or table legs having adjustable lengths.

C. Handlebar Storage

Many wheelchairs are made so that their right and left sides may be collapsed together for storage. The handlebar of this invention also acts as an easily removable brace that prevents accidental collapse of a wheelchair.

Figure 6A:
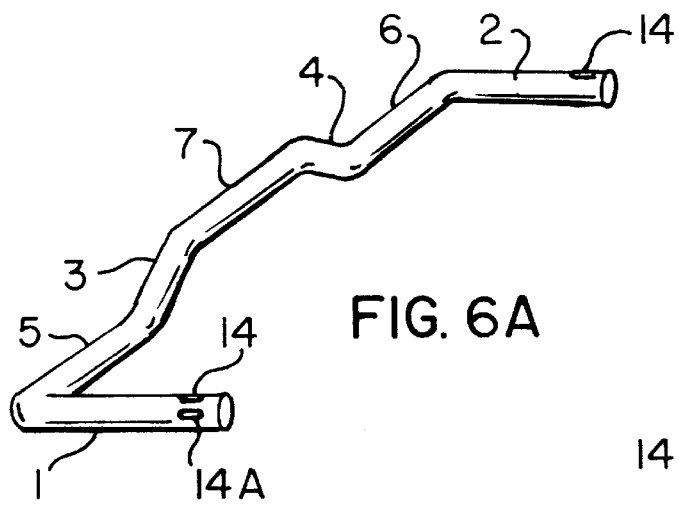
FIGS. 6a, 6b, and 6c show how the inventive handlebar may be stored when not in use.
Figure 6B:
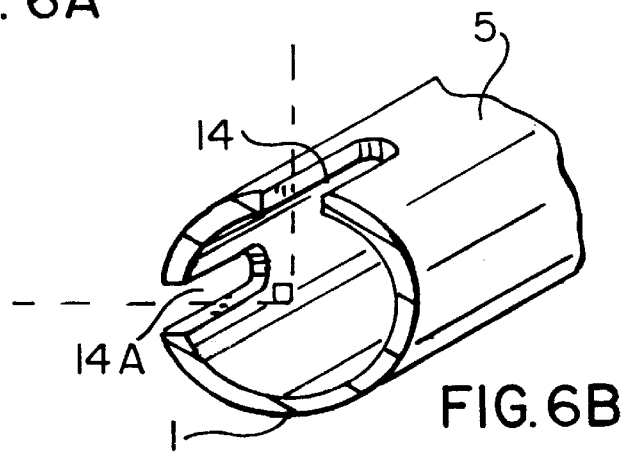
Figure 6C:
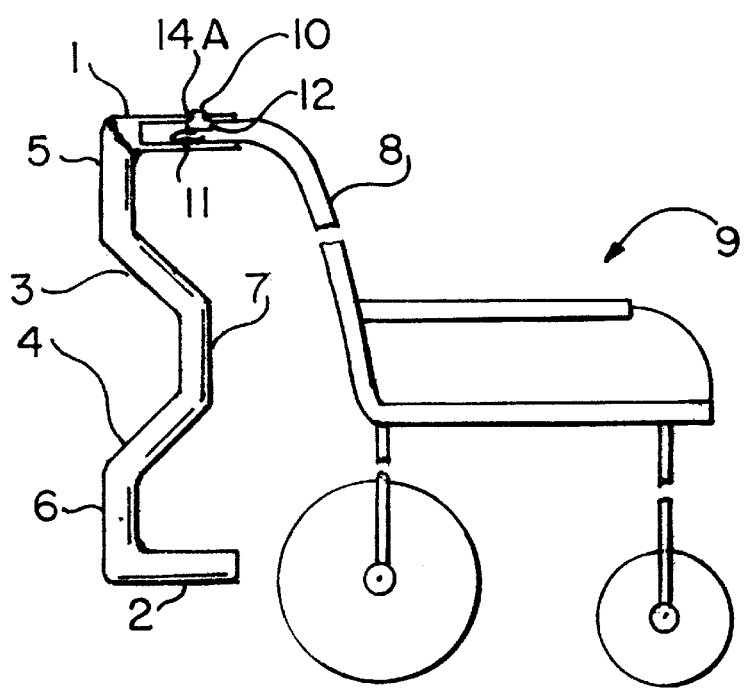

For storage of the handlebar/brace after removal from a wheelchair, one or both ends of the handlebar may be provided with a hole 14a passing through the wall of the handlebar, as shown in FIG. 6a. Hole 14a is the same size as hole 14, and both holes are positioned at a distance 1 from a right angle turn in the handlebar; however, holes 14 and 14a are positioned 90° away from each other, as shown in FIG. 6b. The end of the handlebar having hole 14a may then be positioned on one handle 8 by depressing button 10, sliding the handlebar onto the handle, and allowing button 10 to be biased outwardly through holes 12 and 14a. This locks the handlebar into position so that it extends downwardly along one side of the wheelchair 9, as shown in FIG. 6c. The right and left sides of the wheelchair may then be collapsed together without risk of losing the handlebar.

D. Retrofitting

Retrofitting of wheelchairs which are already ready to use or in use (hereafter referred to as after-market wheelchairs) to accept the handlebar of this invention is very easy. After rubber or plastic handgrips on handles 8 of the after-market wheelchair are removed, a hole 12 which is large enough to admit button 10 is drilled through the wall of each tubular handle 8. A previously described locking mechanism is then positioned inside each handle 8 so that spring 11 biases button 10 through freshly drilled hole 12. The handlebar may then be fitted onto handles 8 as previously described, as long as holes 12 line up with holes 14 on the handlebar.

Figure 7A:
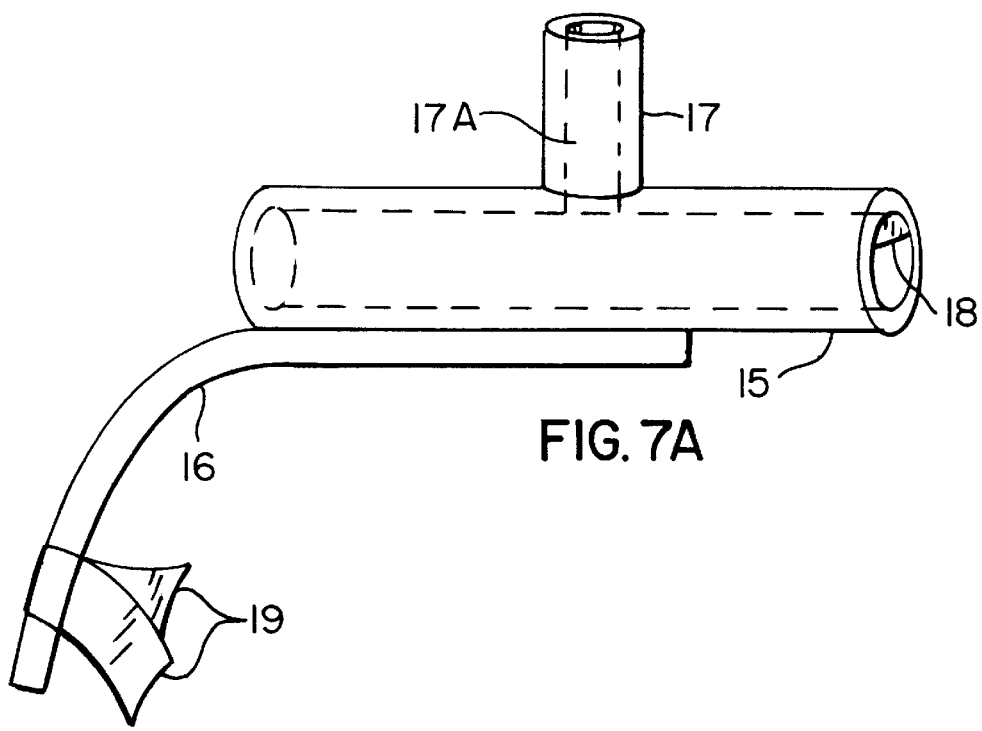
FIG. 7a illustrates a tool for use in retrofitting of existing wheelchairs.
Figure 7B:
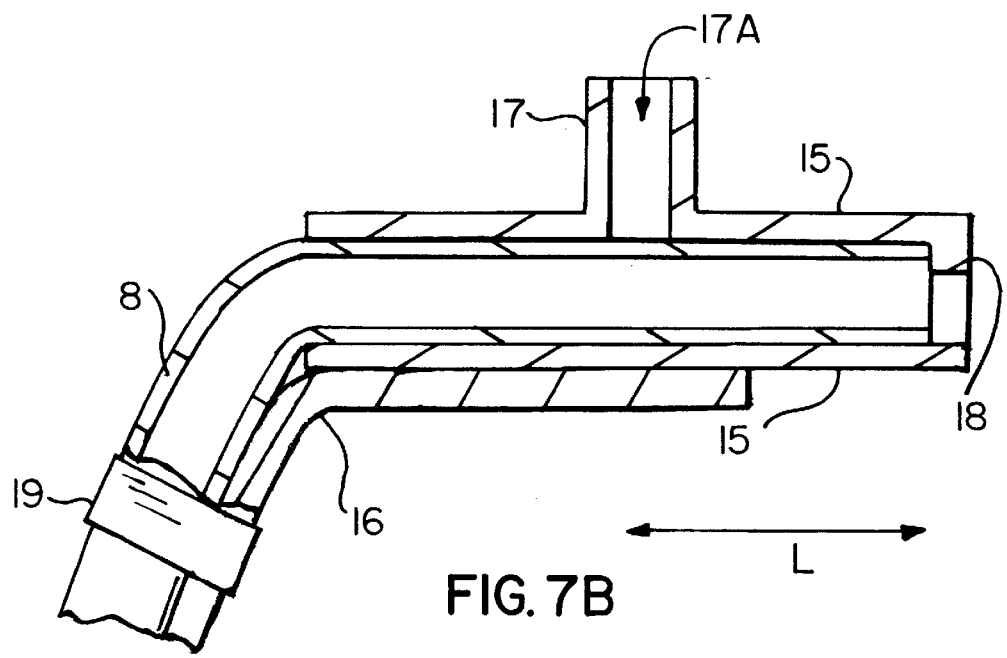
FIG. 7b illustrates the use of the tool.

To aid in positioning holes 12, we provide a tool for use in drilling the holes, shown in FIG. 7a. This tool comprises a tube 15 having two ends and an interior diameter sufficiently large to allow tube 15 to fit over handle 8, a curved extension tongue 16 attached to a first end of tube 15, and a cylindrical guide 17 having a longitudinal hole therethrough attached to the side of tube 15. The tool is positioned on handle 8 by sliding tube 15 handle 8 until a ridge 18 on the interior of a second end of tube 15 contacts the end of handle 8, as shown in FIG. 7b. Extension tongue 16 mates with the surface of handle 8, with the curvature of tongue 16 closely matching the curvature of a curved portion of handle 8. Quick release locking clamps 19 on tongue 16 are used to secure tongue 16 to handle 8. A round guide hole 17a runs lengthwise through the interior of guide 17 and through the wall of tube 15. Hole 17a is a distance 1 away from the inner side of ridge 18. By running a drill through hole 17a, hole 12 may be drilled through the side of handle 8 in the correct position, so that when the handlebar is positioned on handle 8, holes 12 and 14 will line up.

What is claimed is:

1. An ergonomically correct handlebar adapted and arranged to be connected to two spaced and parallel handles separated by a predetermined distance, said handlebar comprising an elongated hollow tube having a first end located at point A and a second end spaced from point A and located at point A', said tube being bent and shaped between its said ends at a series of points B, B', C, C', D, and D' located between points A and A', so that respective positions of points A, A', B, B', C, C', D, D' are defined by a following table of cylindrical coordinates, where height is measured along a B–B' axis and substantially equal in its greatest distance to a predetermined distance between two spaced and parallel handles on which said handlebar is adapted to fit, radius is measured as distance from said B–B' axis, and an angle is measured as rotation about said B–B' axis:

Table of Cylindrical Coordinates

| Point | Height | Radius | Angle |
| --- | --- | --- | --- |
| A | x | a | 0 |
| B | x | 0 | 0 |
| C | x − y | 0 | 0 |
| D | x − (y + z) | b | 30–60° |
| D' | y + z | b | 30–60° |
| C' | y | 0 | 0 |
| B' | 0 | 0 | 0 |
| A' | 0 | a | 0 | where $x=2y+2z+w$, w is a distance between points D and D', and y, z, and w are each greater than zero, and angles at which said tube is bent at points B, B', C, C', D, and D' are determined by a following table of angles:

Table of Angles

| Angle | Degrees |
| --- | --- |
| A-B-C | 90 |
| B-C-D | 120–150 |
| C-D-D' | 120–150 |
| D-D'-C' | 120–150 |
| D'-C'-B' | 120–150 |
| C'-B'-A' | 90 | said handlebar being further characterized in that:
(a) a portion of said hollow tube between points A and B and a portion of said hollow tube between points A' and B' are mutually parallel and adapted and arranged to fit two spaced parallel handles, (b) a portion of said hollow tube between points C and D is a first non-horizontal gripping station adapted to be grasped by a right human hand, said first gripping station being oriented so as to relieve strain on a right wrist and right forearm of a person gripping said first gripping station with a right hand, and (c) a portion of said tube between points C' and D' is a second non-horizontal gripping station adapted to be grasped by a left human hand, said second gripping station being oriented so as to relieve strain on a left wrist and left forearm of a person gripping said second gripping station with a left hand.

2. The handlebar of claim 1 wherein distances between point B and point B' is 18–24 inches, between point C and point D is 3.5–5.0 inches, between point C' and point D' is 3.5–5.0 inches and between point D and point D' is 3.5–12 inches.

3. The handlebar of claim 1 wherein distances between point B and point B' is 18 inches, between point C and point D is 3.5–5.0 inches, between point C' and point D' is 3.5–5.0 inches, and between point D and point D' is 3.5–8 inches.

4. The handlebar of claim 1 wherein distances between point B and point B' is 22 inches, between point C and point D is 3.5–5.0 inches, and between point D and point D' is 3.5–12 inches.

5. The handlebar of claim 1 wherein said handlebar is adapted to fit on a wheelchair, a wheelbarrow, a shopping cart, a baby stroller, a baby carriage, or a bicycle.

6. The handlebar of claim 1 wherein a portion between points D and D' is straight.

7. The handlebar of claim 6 wherein said straight portion is a gripping station adapted to be gripped by a person with either hand or both hands.

8. The handlebar of claim 1 further comprising means of locking said hollow tube to two spaced parallel handles.

9. The handlebar of claim 8 wherein said means of locking includes at least one hole passing through a wall of at least one said portion between points A and B or points A' and B'.

10. The handlebar of claim 9 wherein said at least one hole is adapted to receive a spring loaded push button attached to at least one of two spaced parallel handles.

11. The handlebar of claim 8 wherein said means of locking includes a pair of holes respectively passing through a wall of respective said portions between points A and B and points A' and B'.

12. The handlebar of claim 11 wherein said pair of holes are adapted to respectively receive a pair of spring loaded push buttons attached to respective two spaced parallel handles.

13. An ergonomically correct handlebar adapted and arranged to be connected to two spaced and parallel handles separated by a predetermined distance, said handlebar comprising an elongated hollow tube having a first end located at point A and a second end spaced from point A and located at point A', said tube being bent and shaped between its said ends at a series of points B, B', C, C', D, and D' located between points A and A', so that respective positions of points A, A', B, B', C, C', D, D' are defined by a following table of cylindrical coordinates, where height is measured along a B–B' axis and substantially equal to a predetermined distance between two spaced and parallel handles on which said handlebar is adapted to fit, radius is measured as distance from said B–B' axis, and an angle is measured as rotation about said B–B' axis:

| Table of Cylindrical Coordinates | | | |
|---|---|---|---|
| Point | Height | Radius | Angle |
| A | x | a | 0 |
| B | x | 0 | 0 |
| C | x − y | 0 | 0 |
| D | x − (y + z) | b | 45° |
| D' | y + z | b | 45° |
| C' | y | 0 | 0 |
| B' | 0 | 0 | 0 |
| A' | 0 | a | 0 | where x=2y+2z+w, w is a distance between points D and D', and y, z, and w are each greater than zero, and angles at which said tube is bent at points B, B', C, C', D, and D' are determined by a following table of angles:

| Table of Angles | |
|---|---|
| Angle | Degrees |
| A-B-C | 90° |
| B-C-D | 135° |
| C-D-D' | 135° |
| D-D'-C' | 135° |
| D'-C'-B' | 135° |
| C'-B'-A' | 90° | said handlebar being further characterized in that:

(a) a portion of said hollow tube between points A and B and a portion of said hollow tube between points A' and B' are mutually parallel and adapted and arranged to fit two spaced parallel handles, (b) a portion of said hollow tube between points C and D is a first non-horizontal gripping station adapted to be grasped by a right human hand, said first gripping station being oriented so as to relieve strain on a right wrist and right forearm of a person gripping said first gripping station with a right hand, and (c) a portion of said tube between points C' and D' is a second non-horizontal gripping station adapted to be grasped by a left human hand, said second gripping station being oriented so as to relieve strain on a left wrist and left forearm of a person gripping said second gripping station with a left hand.

14. The handlebar of claim 13 wherein a portion between points D and D' is straight.

15. The handlebar of claim 13 wherein said handlebar is adapted to fit on a wheelchair, a wheelbarrow, a shopping cart, a baby stroller, a baby carriage, or a bicycle.

16. The handlebar of claim 13 wherein said means of locking includes a pair of holes respectively passing through a wall of respective said portions between points A and B and points A' and B'.

17. The handlebar of claim 16 wherein said pair of holes are adapted to respectively receive a pair of spring loaded push buttons attached to respective two spaced parallel handles.

18. The handlebar of claim 13 further comprising means of locking said hollow tube to two spaced parallel handles.

19. The handlebar of claim 18 wherein said means of locking includes at least one hole passing through a wall of at least one said portion between points A and B or points A' and B'.

20. The handlebar of claim 19 wherein said at least one hole is adapted to receive a spring loaded push button attached to at least one of two spaced parallel handles.

* * * * *